United States Patent Office 3,368,866
Patented Feb. 13, 1968

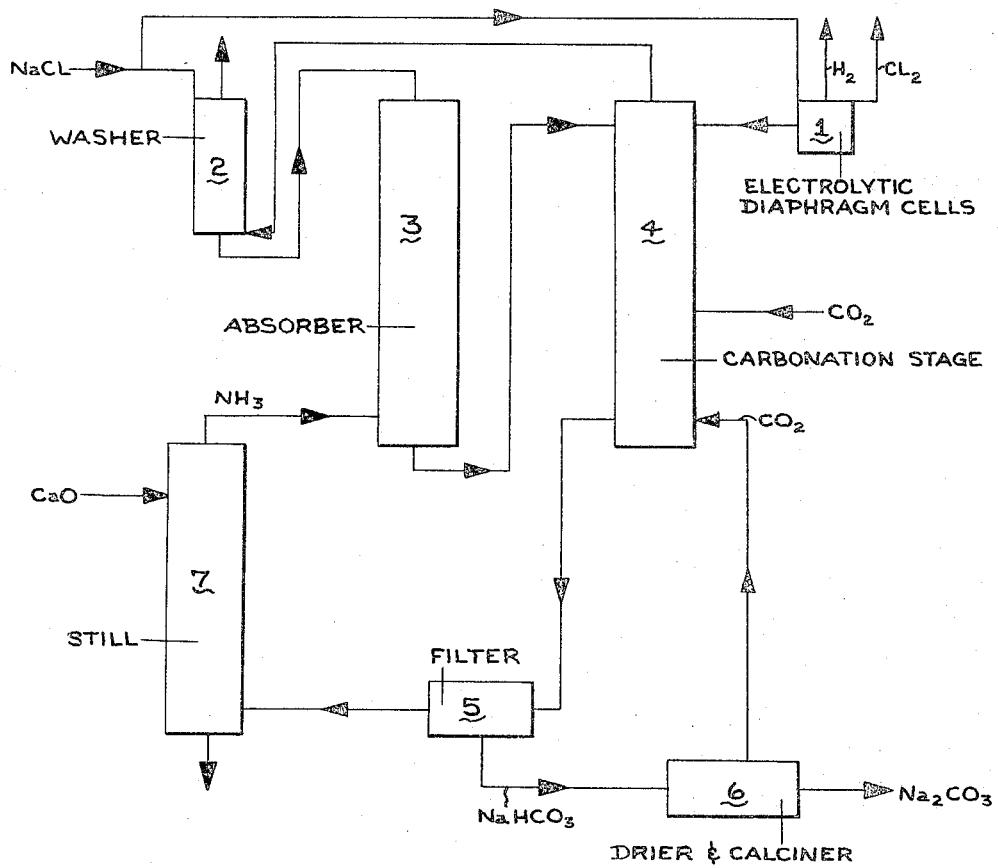

3,368,866
PROCESS FOR THE MANUFACTURE
OF SODIUM CARBONATE
Pierre Seguela, Brussels, Belgium, assignor to Solvay
& Cie, Brussels, Belgium
Continuation-in-part of application Ser. No. 301,467,
Aug. 12, 1963. This application Oct. 19, 1966, Ser.
No. 587,782
Claims priority, application Belgium, Aug. 13, 1962,
621,370
6 Claims. (Cl. 23—63)

ABSTRACT OF THE DISCLOSURE

A process for producing sodium carbonate by calcination of sodium carbonate obtained by mixing the caustic liquor obtained by the electrolysis of sodium chloride brines and an ammoniacal brine containing sodium chloride and ammonia and derived from a conventional ammonia-soda process, and by introducing into this mixture carbon dioxide for producing the carbonation reaction.

This is a continuation-in-part of U.S. Ser. No. 301,467 filed Aug. 12, 1963 now abandoned.

This invention relates to the step in a process for the manufacture of sodium carbonate which comprises the carbonation of an aqueous solution comprising a mixture of caustic soda solution containing sodium chloride and ammoniacal brine containing ammonia and sodium chloride.

The increase in the number and capacity of plants for the electrolysis of sodium chloride brines has brought about a search for new outlets for the caustic soda thus produced. As a result, the carbonation of caustic liquors for the production of sodium carbonate has become of particular interest.

In connection with the above, various processes have been proposed for the carbonation of caustic liquors obtained from the electrolysis of sodium chloride brines both in diaphragm cells and in mercury-cathode cells. All of these processes have been based on the use of gaseous carbon dioxide as the carbonating agent.

In the previously known processes of the above character, the carbonation process has been carried out in the presence of large quantities of water present in the caustic liquors. Such processes required the separation of this water from the sodium carbonate after crystallization, since hydration of the sodium carbonate to the monohydrate, which usually occurs under the carbonation conditions, is not sufficient to fix all of the water in the liquors. It is thus necessary to separate the aqueous phase, saturated with sodium carbonate, which requires recovering the solutions and their evaporation at considerable cost.

Furthermore, in the manufacture of caustic soda and chlorine by electrolysis of sodium chloride solutions in diaphragm cells, conversion of more than 60% of the sodium chloride to caustic soda and chlorine is usually not obtained, with the result that the caustic liquors from the process contain an appreciable amount of sodium chloride as well as sodium hydroxide, the presence of which complicates subsequent treatment of the liquors. In order to attempt to overcome such difficulties, various methods have been suggested in the past for separating the sodium chloride from the caustic liquors and recycling it to the electrolytic cells before proceeding to the carbonation of the caustic soda solution. All of the previously suggested methods for accomplishing this have, however, been found to be impractical from a commercial point of view.

It has now been discovered, in accordance with the present invention, that caustic liquors resulting from the electrolysis of sodium chloride in diaphragm cells can easily and economically be carbonated in the ammonia-soda process for the manufacture of sodium carbonate, without the necessity of removing the water or of separating the sodium chloride from the liquors. This highly desired result is accomplished by carbonating, in an ammonia-soda process for the manufacture of sodium carbonate, a mixture of the ammoniacal brines from said process and solutions of caustic soda containing sodium chloride, separating the resulting precipitated sodium bicarbonate and heating the latter by known methods to produce sodium carbonate.

The caustic liquors which can be carbonated, in accordance with the present invention, include those resulting from the electrolysis of sodium chloride in diaphragm cells and comprising essentially sodium hydroxide and appreciable amounts of unconverted sodium chloride.

One of the advantages of the process of the present invention results from the fact that it does not require the concentration of the aqueous caustic soda solutions before carbonation, since it has been unexpectedly discovered that such solutions can be satisfactorily carbonated by feeding them directly into carbonation units of an ammonia-soda process, without either preliminary evaporation of water or removal of the sodium chloride therein. It has further been unexpectedly discovered that such a carbonation stage can be readily integrated with the various stages in the production of sodium carbonate by the ammonia-soda process, with the result that the whole of the sodium hydroxide and a part of the sodium chloride accompanying it are continuously converted into sodium bicarbonate, even though it had previously been thought that the addition of such liquor to the carbonation unit of an ammonia-soda process would cause dissociation of the ammonia compounds by the action of the sodium hydroxide therein.

It has also been discovered, in accordance with the present invention, that by supplementing the ammonia and carbon dioxide in the above carbonation step and maintaining the normal temperature conditions of the ammonia-soda process carbonation, it is possible to increase very appreciably the conversion of the sodium chloride in the solutions being carbonated to sodium bicarbonate. For example, a high conversion can be attained if the amount of ammonia used is higher than that resulting only from the mixing of the caustic liquor with an ammoniacal brine of the classical ammonia-soda process. Excellent results are obtained when the concentration of ammonia in the mixture of liquors, as compared to the concentration of sodium chloride, is of the same order of magnitude as in the classical ammonia-soda process.

The sodium bicarbonate obtained in the process of the present invention is identical with that produced under normal operating conditions in the conventional ammonia-soda process and, after separation and drying, is readily converted by calcining into sodium carbonate by conventional methods.

From the above, it will be readily evident that the process of the present invention requires the use of smaller amounts of raw materials, including steam and general operating costs, per unit weight of sodium carbonate. The processes of the prior art have been concerned primarily with obtaining the greatest possible amount of sodium hydroxide from the caustic liquors, particularly by recovering the sodium chloride which accompanied it. A major advantage of the present invention, however, comprises the conversion to sodium carbonate of not only the whole of the caustic soda present also also the greater portion of the sodium chloride. Also, of great importance is the fact that the waste liquors remaining after the production of the sodium carbonate, contain relatively smaller quantities of dissolved salts per metric ton of sodium carbonate produced and thus these salts cause less pollution of streams into which they may be discharged.

The following specific examples are given to illustrate in more detail the invention disclosed above. It will be understood, however, that variations from these specific examples will be evident to one skilled in the art. Any such variations, however, are intended to come within the scope of the appended claims.

*Examples*

This example illustrates the carbonation of caustic liquors from diaphragm cells in the ammonia-soda process.

Referring to the accompanying drawing, which illustrates in outline a combined ammonia-soda process and an electrolytic diaphragm cell battery, it will be noted that the purified brine is divided into two parts, one of which is delivered to the battery of electrolytic diaphragm cells 1, and the other part to the ammonia-soda process. This latter part passes successively through a tower 2 for washing the residual carbonation gases, an absorber 3 for absorption of ammonia and carbon dioxide, and then into the carbonation stage 4 to which is also sent the liquor from the electrolytic diaphragm cells. Carbonation is effected in this stage by the use of carbon dioxide from lime kilns and from sodium bicarbonate calciners 6, or from other suitable sources. The slurry of precipitated sodium bicarbonate is withdrawn at the bottom of the carbonation unit 4 and sent to the filter 5 where the bicarbonate is separated. Calcination of this bicarbonate in the calciner 6 yields sodium carbonate. The clear liquid from the filter is sent to the distillation unit 7 for recovery of the ammounia which is recycled to the absorber 3, calcium hydroxide being introduced into the upper part of the distillation unit 7 and the residual liquor from which the ammonia has been removed being withdrawn from the bottom part of the distillation unit 7.

Into the carbonating stage 4 were introduced 3078 kg. of caustic soda liquor, of the type described above, containing 11%, by weight, of sodium hydroxide and 15%, by weight, of sodium chloride, and 6548 kg. of ammoniacal brine from a conventionally operating ammonia-soda process for the production of sodium carbonate, and of conventional composition. The results are shown in the table below.

In a second operation, the carbonation stage 4 was fed with a mixture of 3078 kg. of caustic soda liquor and 6904 kg. of ammoniacal brine in which the concentration of carbon dioxide and of ammonia was higher than in the normally operating ammonia-soda process. The results are shown in the table below.

The results of the experiments carried out as above described are shown in the table below, which shows the consumption and production in kilograms of the various materials of the process, columns 2 and 3 giving comparative results for the above examples, and column 1 showing results for a conventional ammonia-soda process operating under the same conditions as the two examples given above. The values in column 1 are based on one metric ton of sodium carbonate.

TABLE

| Starting Materials for Each Step | 1 | 2 | 3 | Products from Each Step | 1 | 2 | 3 |
|---|---|---|---|---|---|---|---|
| ABSORPTION | | | | | | | |
| Brine: | | | | | | | |
| $NaCl$ | 1,472 | 1,472 | 1,472 | Ammoniacal brine: | | | |
| $H_2O$ | 4,226 | 4,226 | 4,226 | $NaCl$ | 1,472 | 1,472 | 1,472 |
| Gas from distillation step: | | | | $CO_2$ | 248 | 248 | 406 |
| $CO_2$ | 248 | 248 | 406 | $NH_3$ | 449 | 449 | 590 |
| $NH_3$ | 449 | 449 | 590 | $H_2O$ | 4,379 | 4,379 | 4,436 |
| $H_2O$ | 153 | 153 | 210 | | | | |
| | 6,548 | 6,548 | 6,904 | | 6,548 | 6,548 | 6,904 |
| CARBONATION | | | | | | | |
| Ammoniacal | | | | | | | |
| $NaCl$ | 1,472 | 1,472 | 1,472 | Precipitated bicarbonate: $NaHCO_3$ | 1,585 | 2,334 | 2,693 |
| $CO_2$ | 248 | 248 | 406 | Equiv. $Na_2CO_3$ | 1,000 | 1,473 | 1,699 |
| $NH_3$ | 449 | 449 | 590 | Clear liquid: | | | |
| $H_2O$ | 4,379 | 4,379 | 4,436 | $NH_4Cl$ | 1,010 | 1,034 | 1,263 |
| Caustic liquor: | | | | $NaCl$ | 368 | 804 | 554 |
| $NaCl$ | | 463 | 463 | $CO_2$ | 248 | 248 | 406 |
| $NaOH$ | | 338 | 338 | $NH_3$ | 128 | 120 | 189 |
| $H_2O$ | | 2,277 | 2,277 | $H_2O$ | 4,039 | 6,308 | 6,287 |
| Carbonation gas: $CO_2$ | 830 | 1,222 | 1,410 | | | | |
| | 7,378 | 10,848 | 11,392 | | 7,378 | 10,848 | 11,392 |
| DISTILLATION | | | | | | | |
| Clear liquid from carbonation: | | | | | | | |
| $NH_4Cl$ | 1,010 | 1,034 | 1,263 | | | | |
| $NaCl$ | 368 | 804 | 554 | | | | |
| $CO_2$ | 248 | 248 | 406 | Gas sent to absorption: | | | |
| $NH_3$ | 128 | 120 | 189 | $CO_2$ | 248 | 248 | 406 |
| $H_2O$ | 4,039 | 6,308 | 6,287 | $NH_3$ | 449 | 449 | 590 |
| Wash water for filter: $H_2O$ | 562 | 827 | 955 | $H_2O$ | 153 | 153 | 210 |
| Milk of lime: | | | | Residual liquid: | | | |
| $Ca(OH)_2$ | 699 | 715 | 873 | $NaCl$ | 368 | 804 | 554 |
| $H_2O$ | 1,984 | 2,037 | 2,481 | $CaCl_2$ | 1,048 | 1,072 | 1,310 |
| Steam: $H_2O$ | 1,268 | 1,535 | 1,926 | $H_2O$ | 8,040 | 10,902 | 11,864 |
| | 10,306 | 13,628 | 14,934 | | 10,306 | 13,628 | 14,934 |

In comparing the operating conditions in the experiments of the above table, it will be noted that raw material consumption per metric ton of finished product was materially reduced. In fact, the amount of steam used in the distillation step fell from 1268 kg. per metric ton of sodium carbonate in a conventional ammonia-soda process, (Column 1), to 1042 kg. per metric ton of sodium carbonate in the case of Example 1 (Column 2), and to 1133 kg. per metric ton of sodium carbonate in Example 2 (Column 3). Similarly, the quantities of hydrated lime used were reduced from 699 kg. per metric ton of sodium carbonate to 486 kg. and 514 kg. respectively.

It will be noted that the loss of unconverted sodium chloride during the course of the cycle of manufacturing amounts to 545 kg. per metric ton of sodium carbonate in Example 1 (Column 2), as compared to 368 kg. per metric ton or sodium carbonate in a conventional ammonia-soda process (Column 1), but is reduced to 326 kg. per metric ton of sodium carbonate in the more favorable case of Example 2 (Column 3). Although this decrease in loss of sodium chloride amounts to only 42 kg. per metric ton of sodium carbonate, under the operating conditions of this example, it should be noted that in the electrolysis operation, the loss of chlorine, in the form of sodium chloride, is reduced to zero. In effect, the sodium chloride dissolved in the caustic liquor is sent to the ammonia-soda process and thus permits the utilization of the diaphragm cells under conditions of maximum yield. As long as the needs for chlorine and sodium carbonate require a contribution of the conventional ammonia-soda process, it can be readily seen that the production of sodium carbonate from electrolytic caustic soda liquor can be advantageously increased merely by increasing the amount of ammonia, as shown in Column 3, while reducing the production required from the conventional ammonia-soda process.

It should be noted also that the use of the process of the present invention results in materially less pollution of the waters of streams into which the residual liquors from sodium carbonate manufacturing plants are discharged. The results obtained in the above examples show that the quantity of soluble salts discharged as effluent in the form of sodium and calcium chlorides is reduced by 142 kg. per metric ton of sodium carbonate, in the case of Example 1 (Column 2), and by 319 kg. per metric ton of sodium carbonate in the case of Example 2 (Column 3).

By comparing the results shown in Columns 2 and 3, the advantages resulting from the addition of a supplemental amount of ammonia to a mixture of caustic liquor and conventional ammoniacal brine can be seen. The amounts of sodium carbonate obtained in the conventional ammonia-soda process and in the process of Examples 1 and 2 are shown respectively in Columns 1, 2 and 3 of the following table.

TABLE

| $Na_2CO_3$ produced from— | 1 | 2 | 3 |
|---|---|---|---|
| NaCl in ammonia brine | 1,000 | 1,000 | 1,000 |
| NaCl in caustic liquor | | 25 | 251 |
| NaOH in caustic liquor | | 448 | 448 |
| Total | 1,000 | 1,473 | 1,699 |

What is claimed is:

1. In a process for the manufacture of sodium carbonate from sodium bicarbonate obtained from sodium chloride-containing caustic solutions resulting from the electrolysis of sodium chloride solutions in diaphragm cells, the step which comprises subjecting to carbonation with carbon dioxide a mixture of said sodium chloride-containing caustic solution resulting from the electrolysis of sodium chloride solutions in diaphragm cells, and of an ammoniacal brine containing sodium chloride and ammonia, as obtained from a conventional ammonia-soda process.

2. The process of claim 1, wherein the said carbonation is effected by introducing said sodium chloride-containing caustic solution resulting from the electrolysis of sodium chloride solutions in diaphragm cells into the carbonation stage of a process wherein sodium carbonate is being produced by the conventional ammonia-soda process.

3. The process of claim 1, wherein the ammonia present during said carbonation is supplemented by the addition of ammonia in excess of that present in the conventional ammonia-soda process.

4. The process of claim 1, wherein the amount of ammonia present in the mixture subjected to carbonation is substantially at the same concentration, as compared to the concentration of chloride, as in the conventional ammonia-soda process for the production of sodium carbonate.

5. A process as defined in claim 1 wherein the sodium chloride-containing caustic solution is composed of NaCl, NaOH and $H_2O$ and the ammoniacal brine is composed of NaCl, $CO_2$, $NH_3$ and $H_2O$.

6. A process as defined in claim 5 wherein all of the NaOH, and at least part of the NaCl, of said caustic solution are converted into $NaHCO_3$.

References Cited
UNITED STATES PATENTS 2,038,025 4/1936 Cunningham et al. _____ 23—63
2,792,283 5/1957 Hill et al. _____ 23—64

OTHER REFERENCES

Chem. Ab., vol. 52, 14991b.
Hou, Manufacture of Soda, Reinhold Publishing Corp., N.Y., 1942, pp. 143 and 144.

MILTON WEISSMAN, *Primary Examiner.*

OSCAR R. VERTIZ, *Examiner.*

G. T. OZAKI, *Assistant Examiner.*